April 30, 1963     E. J. ZAHURANEC     3,087,704

BLEEDER VALVE OR PURGE VALVE

Filed Nov. 23, 1959

INVENTOR.
EMERY J. ZAHURANEC
BY *Fay & Fay*
ATTORNEYS

United States Patent Office 3,087,704
Patented Apr. 30, 1963

3,087,704
BLEEDER VALVE OR PURGE VALVE
Emery J. Zahuranec, Bedford, Ohio, assignor to Nuclear Products Company, Cleveland, Ohio, a corporation of Ohio
Filed Nov. 23, 1959, Ser. No. 854,839
6 Claims. (Cl. 251—278)

This invention relates to bleeder valves or purge valves of improved construction and highly efficient functional characteristics. The use of purge valves in various applications for venting unwanted gases or liquids is well known. Past years have witnessed the advent of a very large variety of such valves purporting to solve existing problems in connection with the construction and function thereof. While it is true that a number of the proposed purge valve designs have gone a long way towards solving the various problems attendant to such valves, none has been completely satisfactory.

*The Problem and the Objectives*

A common problem which has confronted purge valve designers has been that of inadequate seating of the valving member, either because of a tendency of the particular valve construction involved to allow the interposition of foreign matter between the valving member and its associated seat, or because of a lack of positive control means for the valving member in order that it may be kept in constant alignment with the seat. Other valve designs have been subject to considerable criticism because of a tendency of the valving member to stick, or because of the complexity of the valve either in connection with the physical construction thereof or in connection with the manner in which it is operated. Often, these valves become inadvertently disassembled during operation or maintenance procedures. This results in considerable lost time and nuisance because of the usual relatively inaccessible locations of the valves.

By means of the instant invention, I have been able to solve these problems in a simple and efficient manner without the necessity of employing an extremely complicated or an expensive structure.

It is, therefore, an object of this invention to provide a purge valve which is simple, inexpensive and durable in construction and highly efficient in operation.

It is a further object of this invention to provide a purge valve characterized by its positive action and ease of operation.

It is still another object of this invention to provide a purge valve which is provided with means for preventing foreign material from interfering with the seating action of the valving member thereof.

It is a further object of the invention to provide a purge valve which is provided with means for allowing the operator thereof to locate the position of the relief port by a sense of touch alone.

It is still another object of the invention to provide a purge valve which includes structure for preventing the various component parts of the valve from becoming inadvertently disassociated from one another.

Other and further objects of the invention will be obvious from a detailed description to follow.

*The Description of the Invention*

To the accomplishment of the foregoing and related ends, the invention, then, consists of the means hereinafter fully described and particularly pointed out in the claims, the following description setting forth in detail one of the approved means of carrying out the invention.

Figure 1:
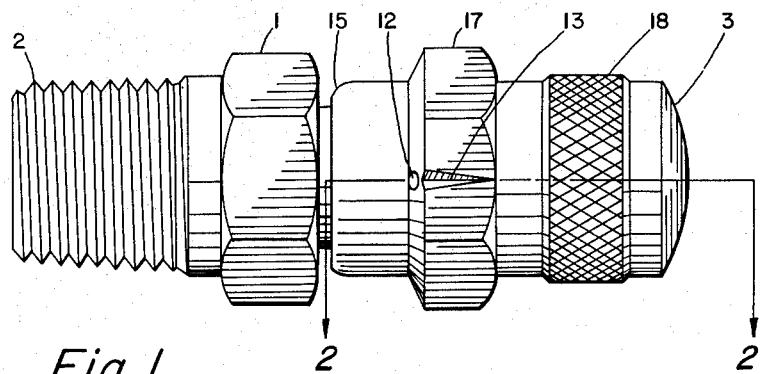
FIG. 1 is a side elevation of a purge valve embodying the invention.

Referring now more particularly to the drawings, FIG. 1 illustrates a valve including a body member 1 which is provided at one end with connecting means 2 for attachment to a fluid line. For purposes of illustration, connecting means 2 have been shown as threads. However, it will be immediately obvious that this need not necessarily be the case. A cap member 3 is threadedly connected at 4 to the other end of the body 1.

A fluid passageway 5 extends axially through the body member 1 and is provided on the end portion thereof opposed to the cap 3 with a co-axial enlargement 6 which provides a seat for the spring member 7. The enlargement 6 is flared to provide a frusto-conical seat 8 co-axially aligned with the enlarged portion 6 of the fluid passageway 5. An axially extending bore 9 extends partly through the cap 3 and is closed at the end by means of a conical seat 10 co-axially aligned with the seat 8 of the body member 1.

A valving ball 11 is interposed between the seat 8 of the body and the seat 10 of the cap. It will be observed that the valving ball is somewhat larger than the largest diameter of the seat 8. This allows the ball 11 to contact the seat 8 along a line offset somewhat from the equator thereof. The practical effect of this arrangement is to prevent dirt from collecting on the seat 8 at the edge thereof to interfere with the seating action. In cases where the ball is constructed of a diameter to allow the same to fit well into the tapered seat, dirt has a tendency to collect along the mouth of the seat and prevent the ball from being freely actuated.

It wll be further observed that the spring 7 is of such length as to be compressed between the ball at one end the spring seat at the other end. This imparts to the ball a positive opening action and further eliminates the tendency thereof to stick.

The valving ball member 11 may be made of steel or similar rigid material especially in instances in which the purge valve is to be used at higher pressures and temperatures. When steel balls are employed, however, it is usually necessary to tighten the cap with a wrench in order to insure proper sealing of the ball against the seat. In some cases, I have found it very desirable to construct the ball from Teflon or nylon. A ball of this construction is particularly adapted for application in valves to be used at lower temperatures and pressures, and allows satisfactory sealing to be accompanied by mere finger tightening of the cap.

A relief port 12 is formed in the cap wall and communicates with the bore 9. It will be observed that the relief port is disposed at an angle to the axis of the cap and is directed away from the free end of the cap. This prevents fluid released from the line 5 through the action of the valving ball member 11 from being directed towards the hand of the operator.

A notch or groove 13 is provided in the well of the cap 3 adjacent the relief port 12 in order that the operator may determine by a sense of touch the disposition of relief port 12 at any given time. It will be recognized that this aids the operator in directing flow of pressurized fluid in the desired direction when the valve is positioned in relatively inaccessible locations in which it may be impossible to determine the position of the relief port by sight.

Figure 2:
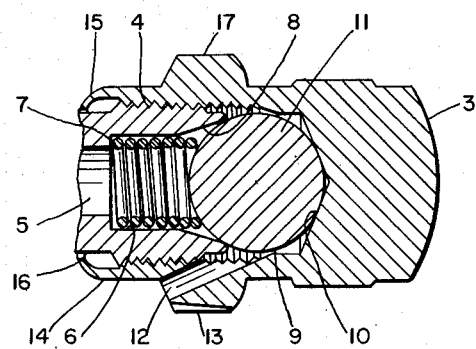
FIG. 2 is a fragmentary longitudinal section showing the valve in closed position and taken along line 2—2 of FIG. 1.
Figure 3:
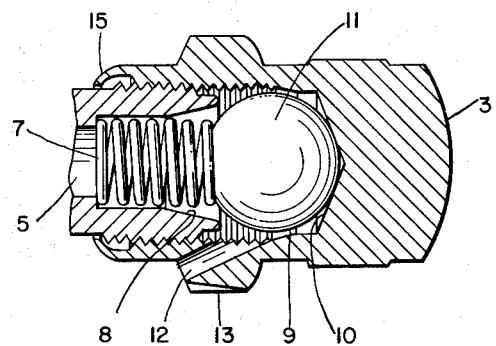
FIG. 3 is a fragmentary view partly in longitudinal section and showing the valve of FIGS. 1 and 2 in the open position.

In order to prevent the cap from becoming threadedly disengaged from the body member 1, I have found it highly desirable to provide a thin skirt portion 14 which may be swaged radially inwardly to form a lip as at 15 along the edge of the cap so as to permanently connect the body member and the cap together. Of course, in order to do this it is necessary to form threads on the cap axially inwardly of the edge thereof as seen in FIGS. 2 and 3 and to provide the body member 1 with a relieved zone as at 16 of smaller diameter than the largest diameter of the thread lands in order that the edge portion 15 of the skirt 14 may be swaged radially inwardly a sufficient distance.

In order to increase the ease with which the cap may be rotated along the threads 4, I have provided the same with two engaging surfaces 17 and a circumferentially extending knurled area 18.

Operation

In operation, when it is desired to open the valve, the cap 3 is rotated to thereby move the conical seat 10 axially away from the seat 8 by means of the threads 4. As this axial movement occurs, the spring 7 gradually elongates to force the ball 11 away from the frusto-conical seat 8, thereby breaking the sealing engagement between the said seat and the ball 11 as shown in FIG. 3. This allows fluid under pressure to flow past the ball into the bore 9 of the cap 3 and from there, by means of the relief port 12, to the atmosphere. When it is desired to close the valve, it is necessary merely to rotate the cap in the reverse direction, whereupon the valving ball 11 is moved against the biasing force of the spring 7 until it eventually resumes its abutting relationship with the frusto-conical seat 8, thereby sealing off the bore 9 from the fluid passageway 5 and preventing further flow of fluids from the passageway through the relief port 12.

The conical seat 10 in the cap acts as an automatic centering means for the ball and in this way maintains the same in constant alignment with the outwardly flared frusto-conical seat 8 to prevent faulty sealing through misalignment of the ball and the seat.

While I have disclosed the principles of the invention as being included in a single embodiment for simplicity of illustration, it will be immediately obvious to one skilled in the art that a number of modifications could be made to that embodiment without departing from the spirit of the invention. It is, therefore, my desire to be limited only by the scope of the appended claims.

I claim:

1. A bleeder valve for use with fluid under pressure, comprising a body member having an axially directed fluid passageway therethrough terminating in an outwardly flared frusto-conical seat, a cap member having an axial bore extending partially therethrough and terminating in an end wall, said body member being telescoped within said cap member and threadedly engaged therewith to provide for relative longitudinal movements therebetween, whereby said end wall and said frusto-conical seat can be moved relatively toward and away from one another, a spherical valving ball interposed in said bore between said end wall and frusto-conical seat, spring biasing means bottomed in said passageway at one end and abutting said ball at the other end, said valving ball being adapted to be sealingly clamped between said seat and said end wall upon relative movement of said cap member and body member toward one another, said spring biasing means being compressed during said movement of said cap member and body member toward one another, whereby said spring biasing means is prepared to assist the pressure in said passageway in moving said ball away from said seat upon relative movement of said cap member and body member away from one another, and a relief port in said cap member in communication with said bore and extending therefrom in a direction away from said end wall towards said body member.

2. A bleeder valve of the character indicated in claim 1, wherein said end wall of the bore in said cap member is conical and diverges toward the open end of said bore, said conical end wall being coaxially arranged with respect to said frusto-conical seat, whereby said valving ball can be maintained in axial alignment with respect to said seat during relative movement of said cap member and body member toward and away from one another.

3. A bleeder valve of the character indicated in claim 1, wherein the diameter of said valving ball is greater than the maximum diameter of said frusto-conical seat, whereby said ball abuts the seat along a line spaced from the equator of said ball when said ball is sealingly clamped between said end wall and seat, thereby to permit direct application of fluid pressure in said passageway against an area of said ball greater than the area of said passageway at the inner end of said frusto-conical seat.

4. A bleeder valve of the character indicated in claim 1, wherein said cap member includes means to limit the extent to which said end wall can be moved away from said frusto-conical seat.

5. A bleeder valve for use with fluid under pressure, comprising a body member having an axially directed fluid passageway therethrough terminating in an outwardly flared frusto-conical seat, a cap member having an axial bore extending partially therethrough and terminating in a conical end wall diverging towards the open end of said bore, said body member being telescoped within said cap member and threadedly engaged therewith to provide for relative longitudinal movements therebetween, whereby said conical end wall and said frusto-conical seat can be moved relatively toward and away from one another, a spherical valving ball interposed in said bore between said frusto-conical seat and said conical end wall, spring biasing means bottomed in said passageway at one end and abutting said ball at the other end, said valving ball being adapted to be sealingly clamped between said seat and said end wall upon relative movement of said cap member and body member toward one another, said spring biasing means being compressed during said movement of said cap member and body member toward one another, whereby said spring is prepared to assist the pressure in said passageway in moving said ball away from said seat upon relative movement of said cap member and body member away from one another, said seat and said end wall being coaxially arranged, whereby said ball can be maintained in axial alignment with said seat during relative movement of said cap member and body member toward and away from one another, the diameter of said ball being greater than the maximum diameter of said frusto-conical seat whereby said ball abuts said seat along a line spaced from the equator of said ball when the ball is sealingly clamped between said end wall and seat, thereby to permit application of fluid pressure in said passageway against an area of said ball greater in magnitude than the area of said passageway at the inner end of said frusto-conical seat, an angularly extending relief port in said cap member in communication with said bore and spaced from the line of abutment between said seat and said ball, said port extending in a direction away from said conical end wall towards said body, and means on said cap member to limit the extent to which said end wall may be moved away from said frusto-conical seat.

6. A bleeder valve of the character indicated in claim 5, wherein said limit means includes a radially inwardly turned lip on said cap positioned to abut a portion of the land of the thread provided on said body member.

References Cited in the file of this patent

UNITED STATES PATENTS

| | | |
|---|---|---|
| 273,831 | Ely | Mar. 13, 1883 |
| 1,254,716 | Madeksho | Jan. 29, 1918 |
| 1,317,885 | Morris | Oct. 7, 1919 |
| 1,525,517 | Smith | Feb. 10, 1925 |
| 1,989,986 | Hudelson | Feb. 5, 1935 |
| 2,632,458 | Slomer | Mar. 24, 1953 |

FOREIGN PATENTS

| | | |
|---|---|---|
| 302,527 | Italy | of 1932 |
| 459,662 | Great Britain | Jan. 11, 1937 |